3,157,699
RECOVERY OF AGARITINE

Edward G. Daniels, Portage Township, Kalamazoo County, Mich., assignor to The Upjohn Company, Kalamazoo, Mich., a corporation of Delaware
No Drawing. Filed Apr. 17, 1961, Ser. No. 103,223
2 Claims. (Cl. 260—519)

The present invention pertains to crystalline, purified agaritine and to a novel process for its preparation by isolation from aqueous solutions containing crude agaritine, that is, agaritine in association with other substances. The invention is more particularly concerned with a novel process wherein, by the use of ion-exchange resins, agaritine is separated and isolated in essentially pure, crystalline form from aqueous solutions containing agaritine and other substances, particularly substances of natural origin.

Agaritine is a substituted hydrazide of L(+)glutamic acid which has been obtained in quite impure form by Levenberg [Fed. Proc. 19, Part I, 6 (1960)] from the press-juice of *Agaricus bisporus*, the common mushroom of commerce in the United States. The compound has the following structural formula:

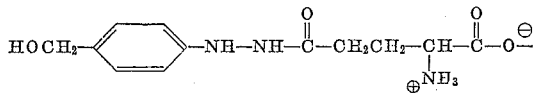

when written in zwitterion form, as is commonly done in the case of α-amino acids. According to systematic nomenclature the compound can be named L(+)glutamic acid 5-[2-(α-hydroxy-p-tolyl) hydrazide], but the trivial name "agaritine" proposed by Levenberg is more convenient and will be used hereinafter.

Agaritine occurs most abundantly in the fruiting body (i.e., the "top" or "button") of mushrooms of the genus Agaricus. The agaritine content of the growing mushroom is highest during about the first two post-emergent days and declines thereafter. After the mushroom has been harvested the agaritine content gradually decreases, probably because of enzymatic action, and in many instances is substantially nil after about five days. Hence, it is most advantageous to employ the fruiting bodies of mushrooms harvested within about two days after emergence from the cultural medium, and to process them according to this invention as soon thereafter as practicable. The agaritine content of such fresh fruiting bodies ordinarily is from about 0.1% to about 0.5% by weight (dry weight basis).

Agaritine is a potent inhibitor of 5-hydroxytryptophan decarboxylase, the enzyme system which is responsible for the conversion of 5-hydroxytryptophan to serotonin in the body [Udenfriend et al., J. Biol. Chem. 224, 803 (1957)]. 5-hydroxytryptophan is known to be the precursor of serotonin released in the brain [serotonin itself does not cross the blood-brain barrier; see Fed. Proc. 15, 402 and 493 (1957)]. While the precise role which serotonin plays in the complex series of chemical reactions occurring in the brain, both normal and abnormal, is not yet clear, it is becoming increasingly evident that serotonin does have a significant effect on the manner in which the brain functions and may be a causative agent in mental disease. The novel compound is the present invention thus provides a regulator for the supply of serotonin to the brain.

The aforesaid inhibitory activity of agaritine also makes it valuable as a laboratory agent. Thus it can be used in the research laboratory to inhibit selectively 5-hydroxytryptophan decarboxylase in mixed enzyme systems. It can also be used in the characterization and quantitative determination of 5-hydroxytryptophan decarboxylase in the laboratory.

The novel process of the present invention involves contacting a mushroom aqueous extract with an anion-exchange resin, eluting the agaritine therefrom, contacting the eluate with a cation-exchange resin, eluting the purified agaritine from the cation-exchange resin, and recovering purified, crystalline agaritine from the eluate.

It is pointed out that while the invention is more particularly described as applied to the use of *Agaricus bisporus*, it can also be applied to the genus Agaricus generally, including the following representative species thereof: *Agaricus campestris, comptulis, crocodilinus, diminutivus, edulis, micromegathus,* and *perrarus*.

In carrying out the novel process of the present invention mushroom tissue, preferably fruiting body tissue, is mixed with a lower alkanol, preferably a lower alkanol of 1 to 3 carbon atoms, e.g., methanol, ethanol, propanol and isopropanol. The tissue and alkanol are mixed in any convenient way, high-speed mixers being particularly suitable for this purpose. The resulting slurry is separated into a solid phase and a liquid phase by filtration, centrifugation, decantation, or the like, and the liquid phase is concentrated, preferably at a temperature below about 35° C., in order to remove all or most of the lower alkanol and to obtain an aqueous concentrate, preferably an aqueous concentrate containing not more than about 5% lower alkanol, by weight.

The concentrate is then contacted with an anion-exchange resin, preferably by passing the concentrate through a column of the resin. The temperature of the chromatographic system is maintained between about 0° C. and 50° C., preferably not above 35° C.

The adsorbed agaritine is eluted from the anion-exchange resin with water. If desired, the entire eluate can be employed in the subsequent step involving the use of a cation-exchange resin; preferably, however, only the fraction richest in agaritine is employed. The agaritine-rich fraction can be identified, for example, by utilizing a Cary spectrophotometer; preferably the fraction collection is started when the intensity of the ultraviolet absorption at 237 m$\mu$ exceeds that at 260 m$\mu$, and is discontinued when the decreased intensity of the ultraviolet absorption at 237 m$\mu$ indicates the presence of little or no further agaritine.

The anion-exchange eluate is adjusted to a pH of between about 6.0 and 7.5 and contacted with a cation-exchange resin, preferably by passing the anion-exchange eluate through a column of the cation-exchange resin. The temperature of this chromatographic system is maintained between about 0° C. and 50° C., preferably not above 35° C.

The adsorbed agaritine is then fractionally eluted from the cation-exchange resin with water. The more desirable fractions, i.e., those richest in agaritine and/or poorest in other substances, are identified, for example, by utilizing a Cary spectrophotometer as indicated above. The fraction (or fractions) so identified is then concentrated and essentially pure, crystalline agaritine is obtained from the concentrate by conventional procedures.

Suitable anion-exchange resins which can be employed in the present process include, e.g., those which are prepared by condensation of an aromatic amine, such as aniline or meta-phenylene diamine, with formaldehyde, as well as melamine condensation products containing free tertiary amino and quaternary ammonium groups as more fully disclosed in U.S. Patent 2,684,321, and also polystyrenes containing quaternary ammonium groups which are preferred. Specific resins include the following quaternary ammonium resins: Amberlite IR–410 (Rohm and Haas Company), Permutit S–2 (Permutit Company), Ionac A–300 (American Cyanamid Company), and Dowex 1 and Dowex 2 (Dow Chemical Company).

Various cation-exchange resins can be employed in the process of the present invention, preferably those containing sulfonic acid groups. More particularly, sulfonated cation-exchange resins employed in the present process can be prepared, e.g., by condensation of phenolic sulfonic acids with formaldehyde or by sulfonation of copolymers of styrene, as more particularly described in U.S. Patent 2,684,321. Representative resins of the phenolic sulfonic acid-formaldehyde type include Amberlite IR–100 (Rohm and Hass Company), Dowex 30 (Dow Chemical Company), and Ionac C–200 (American Cyanamid Company), and representative resins of the sulfonated styrene type include Permutit Q (Permutit Company), Amberlite IR–120 (Rohm and Hass Company), and Dowex 50 (Dow Chemical Company). Other satisfactory sulfonic acid resins include sulfonated coal, such as Catex 27 and Catex 55 (Infilco Company).

The following example is illustrative of the process and product of the present invention:

A. *Preparation of Aqueous Concentrate of* Agaricus Bisporus

Twenty-seven kilograms of 2 day-old mushrooms (*Agaricus bisporus*) were destemmed to yield 19.4 kg. of buttons. Seven hundred grams of the buttons was homogenized for one minute with 1350 ml. of methanol chilled to about 4° C. in a one-gallon stainless high-speed mixer (Waring Blendor). The resulting slurry was allowed to stand for about 30 min. at about 25° C. About 20 g. of filter aid (Celite 545) was added and the slurry was filtered through a Celite 545 pad into a chilled container. After the entire lot of buttons had been thus extracted in batches, the combined methanolic filtrate was evaporated in a flash still to 12 l. in order to remove methanol. During the concentration the temperature was kept below 35° C. The aqueous concentrate so obtained was then frozen for storage.

B. *Preparation of Anion-Exchange Resin Column*

The anion-exchange resin, an 8% cross-linked resin, was prepared by polymerizing styrene with divinylbenzene in suspension, curing, chloromethylating the copolymer with chloromethyl ether using aluminium chloride as a catalyst and reacting the chloromethylated copolymer with dimethylethanolamine in accordance with Kunin, Ion Exchange Resins, John Wiley and Sons, Inc., New York (1958), particularly pages 88 and 97. Particle size can be controlled to some extent by controlling agitation during polymerization, relatively rapid stirring favoring the formation of smaller droplets and hence smaller beads of polymer. A commercial resin corresponding to the above preparation is available, among others, under the trade name Dowex 2 (Dow Chemical Co.).

A column (7.5 cm. x 45 cm.) containing the above anion-exchange resin (100–200 mesh) was prepared and converted to the acetate phase by passing successively through the resin 2.0 l. of 2 N sodium hydroxide, 2.0 l. of water, and 4.0 l. of 10% aqueous acetic acid. The resin was then washed with deionized water until the effluent had pH 4.5. (The resin is regenerated in the above manner after each run, preparatory to the next run.)

C. *Anion-Exchange Resin Chromatography of Aqueous Extract*

Two thousand milliliters of the frozen aqueous extract (i.e., concentrate) prepared in Part A was thawed at 25° C. and was filtered. The filtrate was passed through the anion-exchange resin column at a rate of 500–600 ml./hr. The column was then eluted with deionized water. The eluate between 1350 ml. and 3700 ml. was collected. This fraction was determined to be rich in agaritine by checking the ultraviolet absorption of the eluate with a Cary spectrophotometer periodically. The collection was started when the absorption at 237 m$\mu$ exceeded that at 260 m$\mu$ and continued until the ultraviolet absorption spectrum indicated the presence of little or no agaritine.

D. *Preparation of Cation-Exchange Resin Column*

The cation-exchange resin, a 4% cross-linked resin, was prepared by polymerizing styrene with divinylbenzene in suspension, curing the resulting polymerizate, and thereafter sulfonating the copolymer with sulfuric acid. Advantageously, but not necessarily, the polymerization can be conducted in the presence of a polymerization catalyst such as the peroxides, e.g., benzoyl peroxide, the per-compounds, e.g., ammonium persulfate, or ozone, and the like, as described in U.S. Patent Nos. 2,260,005 and 2,366,007. The particle size of the resin can be controlled to some extent in the same manner as indicated in the preparation of the anion-exchange resin, i.e., by controlling agitation of the reaction mixture during polymerization, relatively rapid stirring favoring the formation of smaller droplets and hence smaller beads of polymer. The degree of cross-linking can vary without materially affecting the end use of the product. Resins suited for use in the manner of this invention can be prepared, for example, as described by Kunin, supra, particularly at pages 79 and 84 thereof. Similarly, applicable resins can be prepared as disclosed in the said U.S. Patent No. 2,366,007, particularly as illustrated in Example 1 thereof.

Resins of the type described are commercially available and include, among others, those sold under the trade names Amberlite IR–120 (Rohm and Haas Co.), and Dowex 50 (Dow Chemical Co.).

A column (10 cm. x 61 cm.) containing the above cation-exchange resin (200–400 mesh) was prepared and converted to the ammonium phase by passage of 2 N ammonium hydroxide through the column. The resin was then washed with water until the effluent had pH 7.0. [For maximum resolution it is recommended that the resin be washed between runs with 8.0 l. of dilute ammonium hydroxide (3 ml. of concentrated ammonium hydroxide per liter of water), followed by water washing until the effluent is neutral (pH 7.0).]

E. *Cation-Exchange Resin Chromatography of Anion-Exchange Resin Eluate*

The agaritine-rich eluate (2350 ml.) obtained in Part C was adjusted to pH 7.0 and passed through the cation-exchange resin column at the rate of 800 ml./hr. The column was eluted with deionized water at the same flow rate; 400-ml. fractions of eluate were collected. Fractions 22–26, inclusive, the most desirable fractions as determined by routine examination with a Cary spectrophotometer, were pooled for use in Part F below.

F. *Crystallization of Essentially Pure, Crystalline Agaritine*

The pooled eluate (fractions 22–26) from Part E was reduced in volume to 50 ml. on a rotary evaporator at a temperature below 38° C. About 50 ml. of ethanol and 200 ml. of butanol were added. The solution was then evaporated under reduced pressure until it became slightly hazy, after which it was kept at 4° C. for 48 hours. The white, highly crystalline material which formed was recovered by filtration under an atmosphere of nitrogen, washed with three 5-ml. portions of butanol and finally with three 10-ml. portions of ether. The crystals were dried in the dark in a vacuum desiccator. There was thus obtained 351 mg. of purified agaritine having a melting point of 205–209° C. (dec.).

*Analysis.* Calcd. for $C_{12}H_{17}N_3O_4$: C, 53.92; H, 6.41; N, 15.72; O, 23.94; —$NH_2$, 5.24. Found: C, 53.89; H, 6.48; N, 15.54; O, 24.38; —$NH_2$, 5.7.

The equivalent weight found by titration with perchloric acid in glacial acetic acid was 269 (theoretical, 267). Titration indicated an acid function (acid anion)

with a pK′$_a$ of about 5.33 in an 83% solution of dimethylformamide in water, and about 3.4 in water; and a basic function (protonated base) with a pK′$_a$ of about 8.74 in an 83% solution of ethanol in water, and about 8.86 in water. $[\alpha]_D^{23}$ +8° (c.=0.80% in water). Ultraviolet absorption spectrum maxima in water at 237 m$\mu$ ($a_M$ 12,300) and 280 m$\mu$ ($a_M$ 1400).

I claim:

1. A process for the recovery of crystalline L(+)-glutamic acid 5-[2-($\alpha$-hydroxy)-p-tolyl hydrazide] which comprises the steps of mixing mushrooms of genus Agaricus with a lower alkanol, separating the liquid phase from the resulting mixture, concentrating said liquid phase at a temperature below about 350° C., contacting the resulting concentrate at a temperature between about 0° C. and 50° C. with an anion-exchange resin selected from the group consisting of an aromatic amine-formaldehyde condensation product, melamine condensation product containing free tertiary amino and quaternary ammonium groups, and polystyrenes containing quaternary ammonium groups, eluting the anion-exchange resin with water, adjusting the eluate pH to between about 6.0 and 7.5, contacting the eluate thus obtained at a temperature between about 0° C. and 50° C. with a sulfonated cation-exchange resin, fractionally eluting the cation-exchange resin with water, and concentrating the eluted fractions.

2. A process for the recovery of crystalline L(+)-glutamic acid 5-[2-($\alpha$-hydroxy-p-tolyl)hydrazide] from *Agaricus bisporus* which comprises the steps of mixing *Agaricus bisporus* with a lower alkanol, separating the liquid phase from the resulting mixture, concentrating said liquid phase at a temperature below about 350° C., contacting the resulting concentrate at a temperature between about 0° C. and 50° C. with a polystyrene anion-exchange resin containing quaternary ammonium groups, eluting the anion-exchange resin with water to obtain an eluate containing L(+)glutamic acid 5-[2-($\alpha$-hydroxy-p-tolyl)hydrazide], adjusting the eluate pH to between about 6.0 and 7.5, contacting said eluate at a temperature between about 0° C. and 50° C. with a sulfonated cation-exchange resin, fractionally eluting the cation-exchange resin with water, and recovering crystalline L(+)glutamic acid 5-[2-($\alpha$-hydroxy-p-tolyl)hydrazide] from the eluted fractions.

References Cited in the file of this patent

UNITED STATES PATENTS 2,510,980　　Jacobs et al. _____ June 13, 1950

OTHER REFERENCES

Weissberger: Technique of Organic Chemistry, page 297 (1950).

Levenberg: Federation Proceedings, vol. 19, No. 1, Part I, page 6 (1960).